United States Patent
Jang

(10) Patent No.: US 9,813,785 B2
(45) Date of Patent: Nov. 7, 2017

(54) TELEMETRY SYSTEM

(71) Applicant: LSIS CO., LTD., Anyang-si, Gyeonggi-do (KR)

(72) Inventor: Sung-Jin Jang, Anyang-si (KR)

(73) Assignee: LSIS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/351,509

(22) Filed: Nov. 15, 2016

(65) Prior Publication Data

US 2017/0245026 A1 Aug. 24, 2017

(30) Foreign Application Priority Data

Feb. 24, 2016 (KR) .................. 10-2016-0022100

(51) Int. Cl.
| | | |
|---|---|---|
| G08B 23/00 | (2006.01) | |
| G08C 15/06 | (2006.01) | |
| H04Q 9/00 | (2006.01) | |
| G01D 4/00 | (2006.01) | |

(52) U.S. Cl.
CPC .............. *H04Q 9/00* (2013.01); *G01D 4/004* (2013.01); *H04Q 2209/43* (2013.01); *H04Q 2209/82* (2013.01)

(58) Field of Classification Search
CPC ... H04Q 9/00; H04Q 2209/82; H04Q 2209/43
See application file for complete search history.

(56) References Cited

U.S. PATENT DOCUMENTS

| | | | |
|---|---|---|---|
| 7,061,924 B1 | 6/2006 | Durrant et al. | |
| 7,304,587 B2* | 12/2007 | Boaz | H04Q 9/00 340/870.02 |
| 7,453,373 B2 | 11/2008 | Cumeralto et al. | |
| 7,463,986 B2 | 12/2008 | Hayes | |
| 8,019,836 B2 | 9/2011 | Elliott et al. | |
| 9,400,192 B1* | 7/2016 | Salser, Jr. | G01D 4/002 |
| 2004/0263352 A1* | 12/2004 | Cornwall | H04Q 9/00 340/870.02 |
| 2005/0132115 A1* | 6/2005 | Leach | G01D 4/004 710/305 |

(Continued)

FOREIGN PATENT DOCUMENTS

| | | |
|---|---|---|
| DE | 10039430 A1 | 2/2002 |
| DE | 102011000516 A1 | 8/2012 |

(Continued)

OTHER PUBLICATIONS

European Search Report dated Jul. 5, 2017 corresponding to application 16193074.8-1568.

*Primary Examiner* — Erin File
(74) *Attorney, Agent, or Firm* — Nath, Goldberg & Meyer; Jerald L. Meyer

(57) ABSTRACT

A telemetry system includes: a plurality of meters; a data reader configured to acquire meter reading information for each of the meters; a transmitter configured to receive the meter reading information for each of the meters acquired through the data reader and transmit a corresponding Bluetooth beacon signal; a receiver configured to receive transmission information from the transmitter; and a meter reading server configured to manage the meter reading information for each of the meters based on the transmission information received through the receiver.

9 Claims, 3 Drawing Sheets

(56) References Cited

U.S. PATENT DOCUMENTS

2006/0114121 A1\* 6/2006 Cumeralto ............... H04Q 9/00
340/870.02
2013/0329768 A1 12/2013 Kagan
2015/0308856 A1 10/2015 Srinivasan et al.

FOREIGN PATENT DOCUMENTS

| EP | 2822290 A1 | 1/2015 |
|---|---|---|
| JP | 2003-521768 A | 7/2003 |
| JP | 2006-054682 A | 2/2006 |
| KR | 10-2014-0106067 A | 9/2014 |
| KR | 10-2015-0106746 A | 9/2015 |
| WO | 2015-045388 A1 | 4/2015 |

\* cited by examiner

PRIOR ART

TELEMETRY SYSTEM

CROSS REFERENCE TO RELATED APPLICATION

This application claims the benefit of Korean Patent Application No. 10-2016-0022100, filed on Feb. 24, 2016, entitled "TELEMETRY SYSTEM", which is hereby incorporated by reference in its entirety into this application.

BACKGROUND

1. Technical Field

The present invention relates to a telemetry system and more particularly, to telemetry system using a Bluetooth beacon technique having merits of low power consumption, high precision of positioning, high reliability and so on.

2. Description of the Related Art

With advance in radio data communication technologies, telemetries using the same have been greatly developed.

Intelligent telemetries are expected to have the global market of about 120 trillion Won [KRW] within the next few years and also are expected to have the Korean domestic market to grow up to a level of about 1.3 trillion Won [KRW].

Conventional telemetry systems often have employed wired/wireless communication schemes such as RS232 and RS485 for wired and Zigbee, WiFi and 6lowpan for wireless.

However, in the conventional telemetry systems employing such communication schemes, a terminal of a remote meter reading device for collecting data is expensive. In addition, the conventional telemetry systems have an inconvenience in that an internal battery has to be frequently exchanged due to its short exchange cycle. In addition, the conventional telemetry systems have a problem in that a communication success rate is not uniform depending on the configuration of a communication network, which may result in low reliability of transmitted data.

SUMMARY

It is an aspect of the present invention to provide a telemetry system employing a Bluetooth beacon technique having merits of low power consumption, precise positioning and high reliability.

The above and/or other aspects and advantages of the present invention will become apparent and more readily appreciated from the following description of the embodiments, taken in conjunction with the accompanying drawings. It should be understood that the objects and advantages of the present invention can be realized by features and combinations thereof set forth in the claims.

In accordance with one aspect of the present invention, there is provided a telemetry system including: a plurality of meters; a data reader configured to acquire meter reading information for each of the meters; a transmitter configured to receive the meter reading information for each of the meters acquired through the data reader and transmit a corresponding Bluetooth beacon signal; a receiver configured to receive transmission information from the transmitter; and a meter reading server configured to manage the meter reading information for each of the meters based on the transmission information received through the receiver.

The data reader and the transmitter may be configured in an integrated form, and the data reader may acquire the meter reading information from each of the meters periodically.

The receiver may receive and process the transmission information transmitted from a plurality of transmitters.

The meter reading server may perform management for each of the meters based on information delivered from a plurality of receivers.

In accordance with another aspect of the present invention, there is provided a telemetry system including: a plurality of meters; a plurality of transmitters attached respectively to the meters and configured to receive meter reading information of the meters and transmit a corresponding Bluetooth beacon signal; a data relay configured to relay transmission information transmitted from the plurality of transmitters; a receiver configured to receive the transmission information relayed through the data relay; and a meter reading server configured to manage the meter reading information for each of the meters based on the transmission information received through the receiver.

The transmission information may include the meter reading information of the meters and identification information generated based on positional information of the meters.

The transmitters may acquire the meter reading information from the meters periodically.

The receiver may receive and process the transmission information transmitted from a plurality of data relays.

The meter reading server may perform management for each of the meters based on information delivered from a plurality of receivers.

Advantages of the Invention

According to the present invention, it is possible to provide a telemetry system with low power consumption and high reliability, which can be constructed at relatively low costs by applying a Bluetooth beacon technique having merits of low power consumption, precise positioning and high reliability.

DETAILED DESCRIPTION

Figure 1:
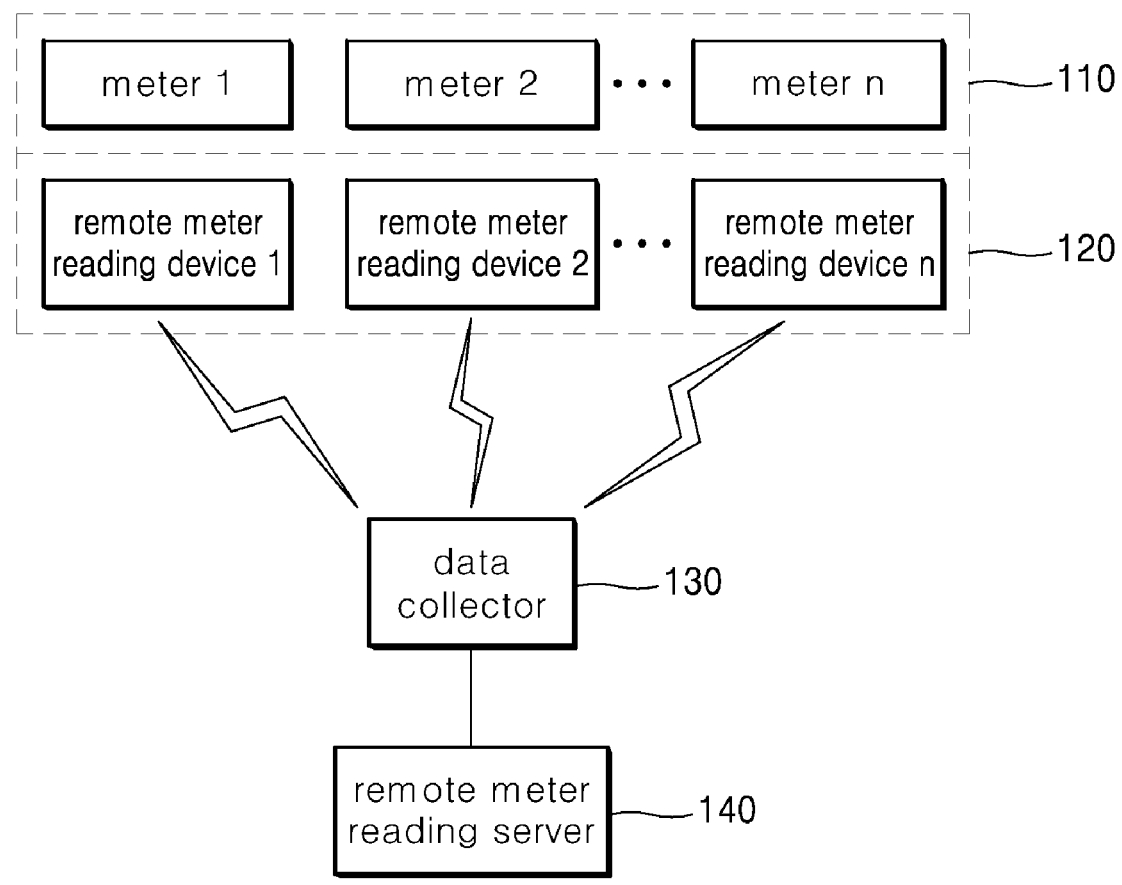
FIG. 1 is an explanatory view illustrating the configuration of a conventional telemetry system.

The above objects, features and advantages will become more clearly apparent from the following detailed description in conjunction with the accompanying drawings. Therefore, the technical ideas of the present invention can be easily understood and practiced by those skilled in the art. In the following detailed description of the present invention, concrete description on related functions or constructions will be omitted if it is deemed that the functions and/or constructions may unnecessarily obscure the gist of the present invention.

Hereinafter, preferred embodiments of the present invention will be described in detail with reference to the accompanying drawings. Throughout the drawings, the same or similar elements are denoted by the same reference numerals.

FIG. 1 is an explanatory view illustrating the configuration of a conventional telemetry system.

Referring to FIG. 1, a conventional telemetry system includes a plurality of meters 110, a plurality of remote meter reading devices 120 attached respectively to the plurality of meters 110, a data collector 130, a remote meter reading server 140, and so on.

Each meter 110 may be a typical meter for metering the usage of electricity, gas, tap wafer, hot water and so on and display metering information in an analog or digital manner.

Each remote meter reading device 120 reads the metering information from the meter 110 and then delivers this read information to the data collector 130 using a data communication scheme. In this case, when the meter 110 displays the metering information in the analog manner, the remote meter reading device 120 may be configured to count an analog data pulse. In addition, the remote meter reading device 120 may be configured to include an analog-digital converter (ADC) or the like for converting the analog metering information into digital metering information.

The data collector 130 functions as a communication relay to collect data delivered from the plurality of remote meter reading devices 120 and deliver the collected data to the remote meter reading server 140.

At this time, as described earlier in the "BACKGROUND," a wired data communication scheme such as RS232, RS485 or the like or a wireless data communication scheme such as Zigbee, WiFi, 6lowpan or the like may be used between the plurality of remote meter reading devices 120 and the data collector 130.

However, in the conventional telemetry system applying such a communication scheme, a terminal of the remote meter reading device 120 attached to each meter 110 is expensive. In addition, the conventional telemetry system has an inconvenience in that an exchange cycle of an internal battery of the remote meter reading device 120 is short and a problem in that a communication success rate is not uniform depending on the configuration of a communication network.

Figure 2:
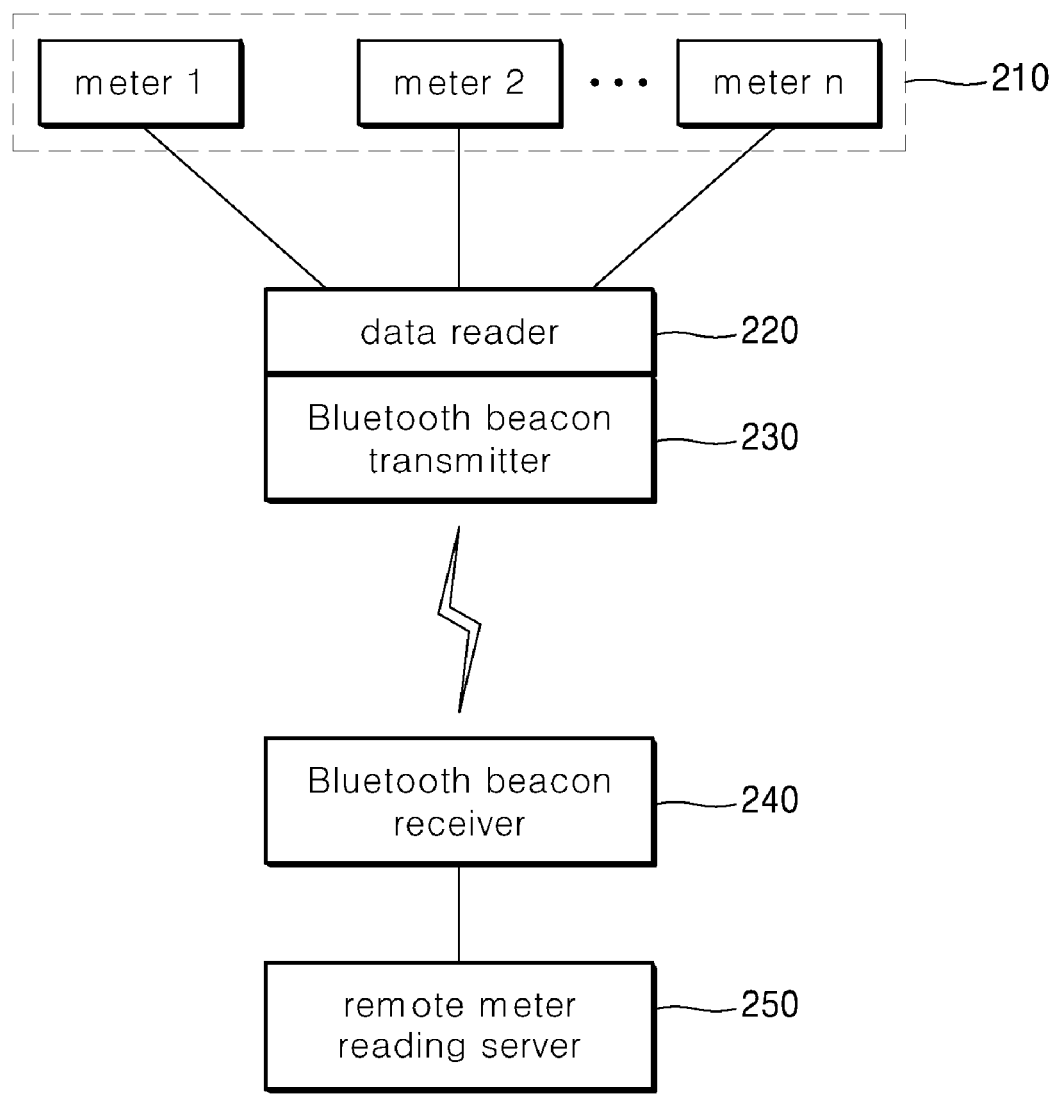
FIG. 2 is an explanatory view illustrating the configuration of a telemetry system according to one embodiment of the present invention.

FIG. 2 is an explanatory view illustrating the configuration of a telemetry system according to one embodiment of the present invention.

Referring to FIG. 2, a telemetry system according to one embodiment of the present invention includes a plurality of meters 210, a data reader 220, a Bluetooth beacon transmitter 230, a Bluetooth beacon receiver 240, a remote meter reading server 250, and so on.

That is, the present invention is to provide a novel telemetry system configured to apply a Bluetooth beacon (sometimes abbreviated as a "beacon") for transmitting metering information of the meters 210 to the remote meter reading server 250 to a conventional typical telemetry system. In other words, the present invention applies the Bluetooth beacon technique for a data communication scheme for remote meter reading, without a change in the meters 210 and the remote meter reading server 250. To this end, according to one embodiment of the present invention, the telemetry system is configured to include a transmitter and a receiver.

A "beacon" used herein refers to a BLE (Bluetooth Low Energy)-based radio communication device which is in the spotlight as the core technology in the era of Internet of Things (IoT).

The beacon is first being actively used in the mobile marketing field since it can recognize an access of a device with a Bluetooth function, such as a smartphone or the like, and offer a variety of information and services to the accessed device. However, because of its convenience in use due to its merits of low power consumption and high accuracy, the beacon is expected to show the unlimited growth potential in conjunction with a variety of services in the future. Incidentally, as a Bluetooth 4.0 (BLE) protocol-based NFC (Near-Field Communication) device, the Bluetooth beacon has the ability to communicate with devices within a range of 70 m at maximum and has the accuracy so high that the devices can be identified in the units of 5 to 10 cm. In addition, because of its low power consumption, the Bluetooth beacon is suitable to implement Internet of Things (IoT) in which all devices are always connected.

A typical Bluetooth beacon system may include a beacon transmitter for transmitting data and a data relay which detects a beacon transmitter and a beacon receiver and provides both of transmitting/receiving services. In addition, the typical Bluetooth beacon system may include a beacon receiver which detects a transmitter and a data relay and only receives data, and a cloud which collects a variety of information from beacon receivers and determines an execution.

Referring to FIG. 2 again, each meter 210 can perform a function of metering and displaying the usage of electricity, gas, tap wafer, hot water and so on.

The data reader 220 may be configured to be adjacent to or integrated with the Bluetooth beacon transmitter 230 at a position distant from the meters 210 and performs a function of acquiring meter reading information on each meter 210. The data reader 220 may be configured to acquire the meter reading information from each meter 210 periodically. That is, the telemetry system according to the embodiment of the present invention may be configured to replace remote meter reading devices applied to the conventional telemetry system with the data reader 220 and the Bluetooth beacon transmitter 230 in a one-to-one correspondence. In addition, the telemetry system according to the embodiment of the present invention may be configured to replace a number of remote meter reading devices with a single data reader 220 and a single Bluetooth beacon transmitter 230.

In this case, when the meter 210 displays the metering information an analog manner, the data reader 220 may be configured to count an analog data pulse. In addition, the data reader 220 may be configured to include an analog-digital converter (ADC) or the like for converting the analog metering information into digital metering information, as described above.

Here, any typical wired/wireless data communication schemes may be applied to allow the data reader 220 to read the meter reading information of the meters 210. It may be desirable that the meter reading information consists of minimal data including meter identification (ID) and metering data.

The Bluetooth beacon transmitter 230 performs a function of receiving the meter reading information on each meter 210, which is acquired through the data reader 220, and transmitting a corresponding Bluetooth beacon signal. In addition, the Bluetooth beacon receiver 240 performs a function of receiving transmission information of the Bluetooth beacon transmitter 230 and transmitting this received information to the remote meter reading server 250.

That is, the present invention has the configuration where the data reader 220 reads the meter reading information from each meter 210 and delivers the read information to the Bluetooth beacon transmitter 230, the Bluetooth beacon transmitter 230 transmits the delivered reading information to the Bluetooth beacon receiver 240, and the Bluetooth beacon receiver 240 delivers the transmitted reading information to the remote meter reading server 250.

In other words, the present invention is configured to carry the meter reading information received from the data reader 220 on a transmission data packet of the Bluetooth beacon transmitter 230 configured to enable only data transmission and transmit the transmission data packet carried with the meter reading information to the Bluetooth beacon receiver 240 configured to enable only data reception. At this time, it is to be understood by those skilled in the art that the data transmission of the Bluetooth beacon transmitter 230 can be performed in a certain cycle.

Here, it may be desirable that the data reader 220 and the Bluetooth beacon transmitter 230 are integrated or adjacent to each other and the Bluetooth beacon receiver 240 and the remote meter reading server 250 are integrated or adjacent to each other.

For reference, the Bluetooth beacon receiver 240 may be equipped in a user's mobile terminal or may be configured with a separate mobile terminal or the like. Thus, it is possible to provide a configuration where a user moves to receive data delivered from a plurality of Bluetooth beacon transmitters 230 and then the remote meter reading server deals with the received data. In this case, likewise, it may be desirable that the Bluetooth beacon receiver 240 and the remote meter reading server 250 are integrated or adjacent to each other, as described above.

The remote meter reading server 250 may be configured to perform a function such as automatic fee settlement for each user by storing/managing meter reading information on the respective meters 210 based on the information received through the Bluetooth beacon receiver 240.

At this time, one data reader 220 may be configured to collect data transmitted from a number of meters 210 and transmit the collected data through the Bluetooth beacon transmitter 230. In addition, one Bluetooth beacon receiver 240 may be configured to receive and process transmission information transmitted from a number of Bluetooth beacon transmitters.

In addition, the remote meter reading server 250 may be configured to perform management for each meter based on information delivered from a number of Bluetooth beacon receivers 240.

Such a remote meter reading server 250 can manage connection between the Bluetooth beacon transmitter 230 and the Bluetooth beacon receiver 240. That is, upon receiving new meter reading information from any meter 210, the remote meter reading server 250 can set the optimal route for delivery of the meter reading information in consideration of communication coverage of the beacon devices 230 and 240. In addition, the remote meter reading server 250 can allocate the corresponding Bluetooth beacon transmitter 230 and Bluetooth beacon receiver 240.

However, even when such setting of the communication route is achieved through the remote meter reading server 250 as described above, data delivery depending on the characteristics of Bluetooth beacon communication having a function of finding a receiver within the communication coverage and transmitting data may be possible. For example, assume that a communication route set by the remote meter reading server 250 is in busy or has a communication failure occurring due to an unexpected external factor. In this case, the Bluetooth beacon transmitter 230 can perform transmission of the corresponding data through another Bluetooth beacon receiver 240 located within the communication coverage. If the data delivery is performed through a receiver other than the Bluetooth beacon receiver 240 designated by the remote meter reading server 250, it is to be understood by those skilled in the art that identification data indicating whether or not data being transmitted are meter reading information of which meter 210 may be added.

For reference, supply of power for operation of the Bluetooth beacon transmitter 230 may be achieved through a typical battery or the like. However, it may be more desirable that a commercial power source or a solar power source is used to prevent system malfunctioning or incorrect meter reading due to any power outage. However, the present invention is not necessarily limited to such a configuration.

Figure 3:
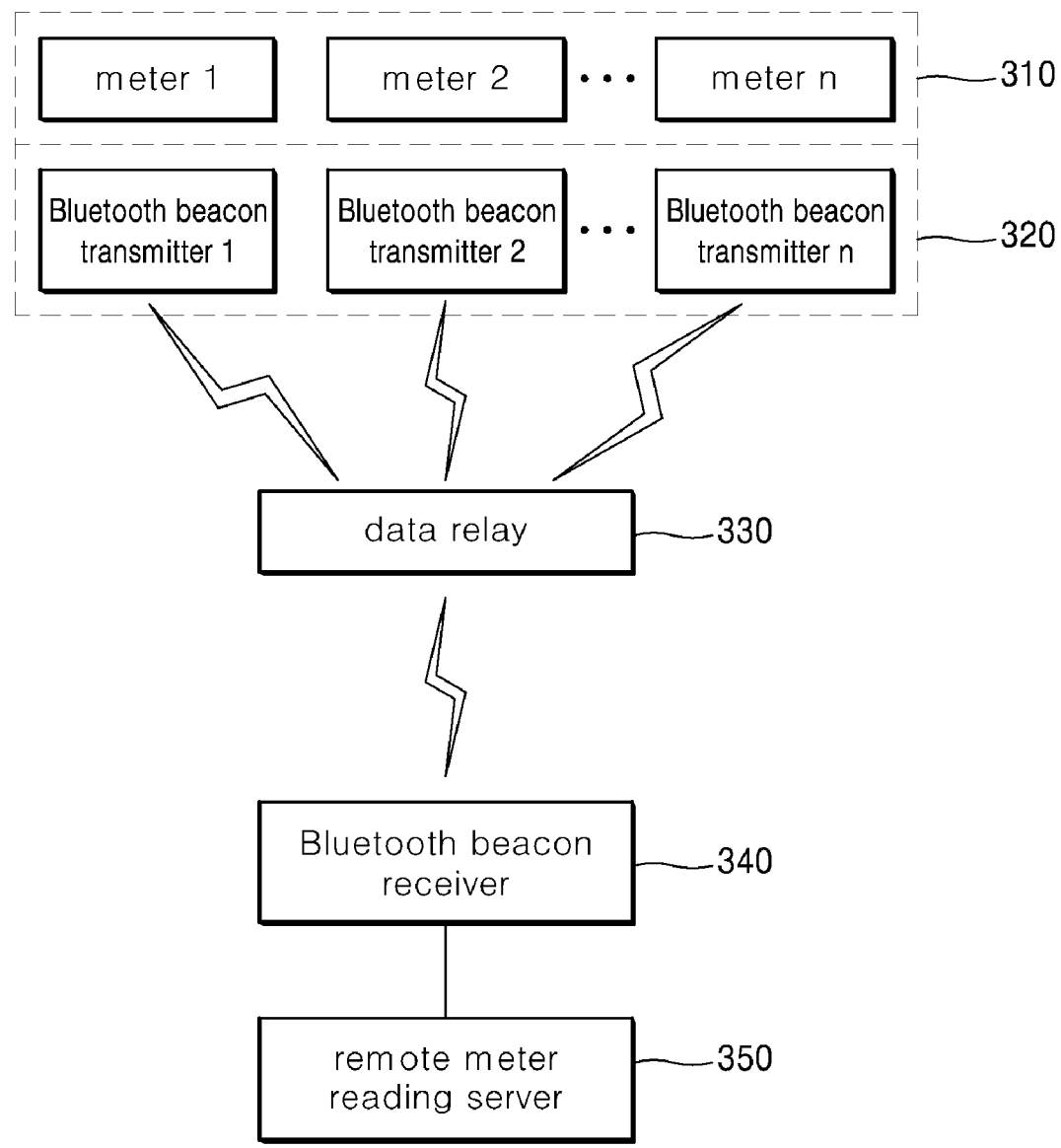
FIG. 3 is an explanatory view illustrating the configuration of a telemetry system according to another embodiment of the present invention.

FIG. 3 is an explanatory view illustrating the configuration of a telemetry system according to another embodiment of the present invention.

Referring to FIG. 3, a telemetry system according to another embodiment of the present invention includes a plurality of meters 310, a plurality of Bluetooth beacon transmitters 320 integrated respectively with the plurality of meters 310, a data relay 330, a Bluetooth beacon receiver 340, a remote meter reading server 350, and so on.

That is, the telemetry system according to another embodiment of the present invention illustrated in FIG. 3 has a difference with the telemetry system of FIG. 2 in that the meters 310 are respectively integrated with the Bluetooth beacon transmitters 320. In addition, the telemetry system according to another embodiment of the present invention has another difference with the telemetry system of FIG. 2 in that the data relay 330 is used to deliver data from the plurality of Bluetooth beacon transmitters 320 to the Bluetooth beacon receiver 340.

The Bluetooth beacon transmitters 320 are attached to their respective meters 310 and perform a function of receiving meter reading information of the meters 310 and transmitting a corresponding Bluetooth beacon signal. The Bluetooth beacon transmitters 320 may read the analog or digital meter reading information of the respective meters 310 in the same manner as described above.

The data relay 330 performs a function of again transmitting a signal, which is transmitted from each of the Bluetooth beacon transmitters 320, to the Bluetooth beacon receiver 340. It should be here noted that a plurality of data relays 330 may be used for data transfer between the Bluetooth beacon transmitters 320 and the Bluetooth beacon receiver 340.

The Bluetooth beacon receiver 340 performs a function of receiving data from the data relay 330 and delivering the received data to the remote meter reading server 350.

The remote meter reading server 350 may be configured to perform a function such as automatic fee settlement for each user by storing/managing meter reading information on the respective meters 310 based on the information received through the Bluetooth beacon receiver 340.

Here, the Bluetooth beacon receiver 340 may be configured to receive information from a number of data relays 330. In addition, the remote meter reading server 350 may be configured to perform management for each meter based on information delivered from a number of Bluetooth beacon receivers 340, as described above.

At this time, transmission information transmitted through the Bluetooth beacon transmitters 320 may include the meter reading information and identification information of the meters 310. It may be more desirable that the identification information of the meters 310 is generated based on positional information of the meters 310. In other words, the Bluetooth beacon technique can facilitate position identification with a very high precision of a several cm level. Accordingly, when such positional information is used as meter identification information included in the meter reading information transmitted through the Bluetooth beacon transmitters 320 provided for their respective meters 320, it is possible to provide additional merits such as precise identification and decrease in data capacity for each meter 310.

In the meantime, in the above embodiment, the Bluetooth beacon receiver 340 may be configured in the form of a mobile terminal or the like. In addition, it is to be understood that the remote meter reading server 350 can perform a function of setting an optimal data transmission route in consideration of communication coverage, as described earlier.

In addition, supply of power for operation of the Bluetooth beacon transmitters 320 and the data relay 330 may be achieved by using a commercial power source or a solar power source, instead of a typical battery. Accordingly, it is possible to prevent system malfunctioning or incorrect meter reading due to any power outage, as described earlier.

In the end, the present invention can provide a telemetry system with low power consumption and high reliability, which can be constructed at relatively low costs by applying a Bluetooth beacon technique having merits of low power consumption, precise positioning and high reliability.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A telemetry system connected to a plurality of meters for remote metering, the telemetry system comprising:
   a data reader configured to acquire meter reading information for each of the meters;
   a transmitter configured to receive the meter reading information for each of the meters acquired through the data reader and transmit a corresponding signal;
   a receiver configured to receive transmission information from the transmitter; and
   a meter reading server configured to manage the meter reading information for each of the meters based on the transmission information received through the receiver,
   wherein the transmitter is configured to transmit the meter reading information to a corresponding Bluetooth beacon signal using a Bluetooth beacon technique that is a Bluetooth 4.0 protocol-based NFC (Near-Field Communication) technique.

2. The telemetry system according to claim 1, wherein the data reader and the transmitter are configured in an integrated form, and
   wherein the data reader acquires the meter reading information from each of the meters periodically.

3. The telemetry system according to claim 1, wherein the receiver receives and processes the transmission information transmitted from a plurality of transmitters.

4. The telemetry system according to claim 1, wherein the meter reading server performs management for each of the meters based on information delivered from a plurality of receivers.

5. A telemetry system connected to a plurality of meters for remote metering, the telemetry system comprising:
   a plurality of transmitters attached respectively to the meters and configured to receive meter reading information of the meters and transmit a corresponding signal;
   a data relay configured to relay transmission information transmitted from the plurality of transmitters;
   a receiver configured to receive the transmission information relayed through the data relay; and
   a meter reading server configured to manage the meter reading information for each of the meters based on the transmission information received through the receiver,
   wherein the transmitters are configured to transmit the meter reading information to a corresponding Bluetooth beacon signal using a Bluetooth beacon technique that is a Bluetooth 4.0 protocol-based NFC (Near-Field Communication) technique.

6. The telemetry system according to claim 5, wherein the transmission information includes the meter reading information of the meters and identification information generated based on positional information of the meters.

7. The telemetry system according to claim 5, wherein the transmitters acquire the meter reading information from the meters periodically.

8. The telemetry system according to claim 5, wherein the receiver receives and processes the transmission information transmitted from a plurality of data relays.

9. The telemetry system according to claim 5, wherein the meter reading server performs management for each of the meters based on information delivered from a plurality of receivers.

* * * * *